United States Patent [19]

Nottingham

[11] 4,072,873
[45] Feb. 7, 1978

[54] BIAXIAL COMPRESSION PHASE LEAD CONNECTOR

[75] Inventor: Lawrence D. Nottingham, North Huntingdon, Pa.

[73] Assignee: Westinghouse Electric Corporation, Pittsburgh, Pa.

[21] Appl. No.: 594,479

[22] Filed: July 9, 1975

[51] Int. Cl.² .......................................... H02K 11/00
[52] U.S. Cl. .................................... 310/71; 310/260; 174/88 S; 336/197
[58] Field of Search ................... 310/71, 194, 162, 42, 310/208, 260, 214, 270; 336/107, 192, 197; 339/263, 265, 266 G, 270; 322/25; 174/945, 88 S, 88 B, 156

[56] References Cited

U.S. PATENT DOCUMENTS

| 1,876,584 | 9/1932 | Austin | 339/270 |
| 2,092,372 | 9/1937 | Goeller | 339/270 |
| 3,648,091 | 3/1972 | Kostin | 310/260 |

FOREIGN PATENT DOCUMENTS

| 170,534 | 2/1952 | Austria | 310/270 |
| 616,312 | 9/1956 | Canada | 174/945 |
| 1,217,672 | 5/1960 | France | 174/156 |
| 550,147 | 10/1956 | Italy | 339/270 |

Primary Examiner—R. Skudy
Attorney, Agent, or Firm—J. W. Keen

[57] ABSTRACT

A connector assembly for joining gas-cooled conductors of a dynamoelectric machine. Conductor compression in two mutually perpendicular directions is provided by a pair of plate members which are slideably engaged with a pair of wedge members. A compressive force applied to the plate members is transmitted directly to overlapping conductor end portions in a first direction, and a component of the compressive force is also transmitted to the conductors in a direction normal to the first direction by means of an inclined surface engaging arrangement between the wedge and plate member. The positive, controllable biaxial compression feature provides high mechanical strength and good electrical conductivity. Bolts for securing the plate and wedge members together are inserted from only one side of the connector, thereby providing easy assembly and clearance for induction soldering and ultrasonic inspection.

6 Claims, 8 Drawing Figures

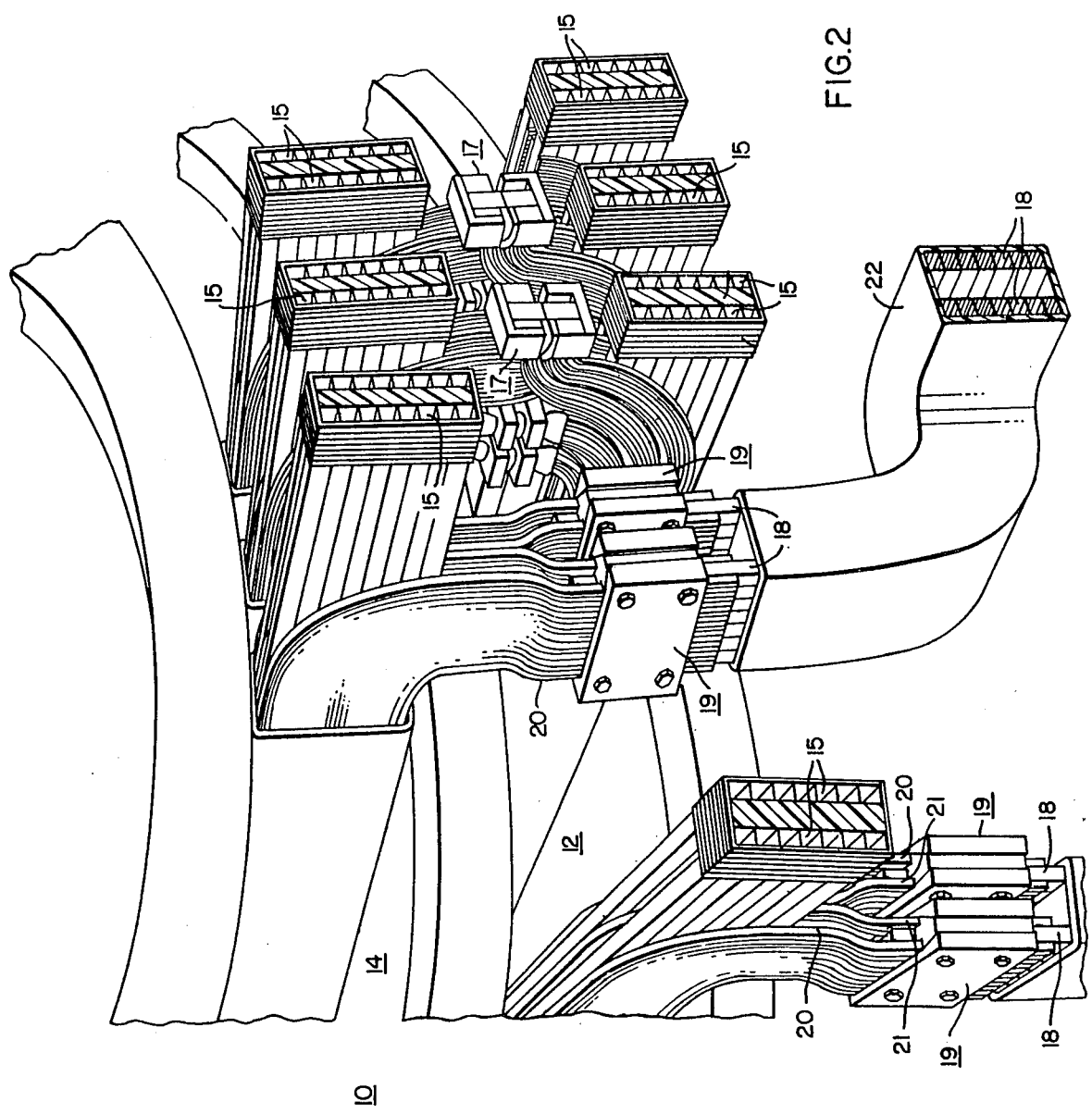

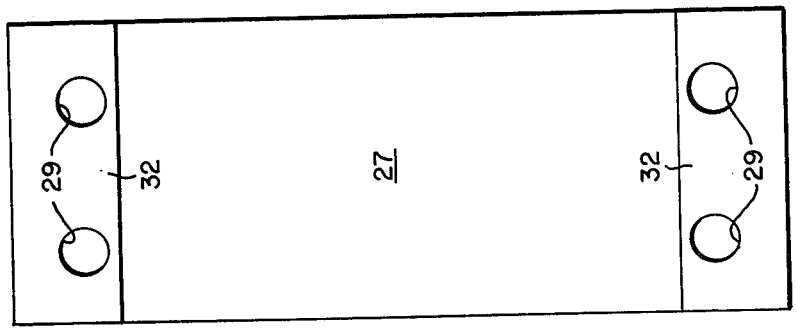
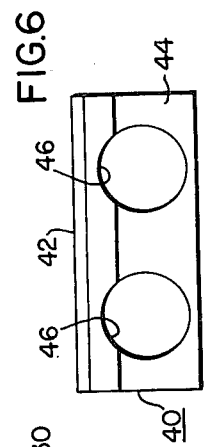
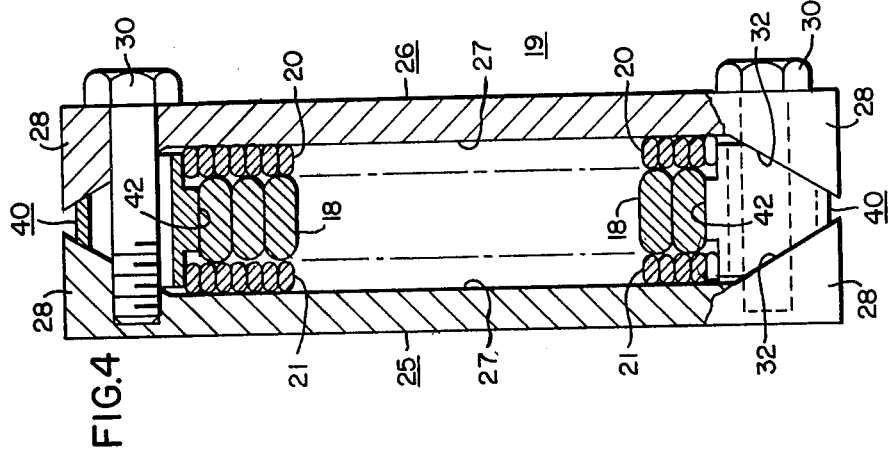
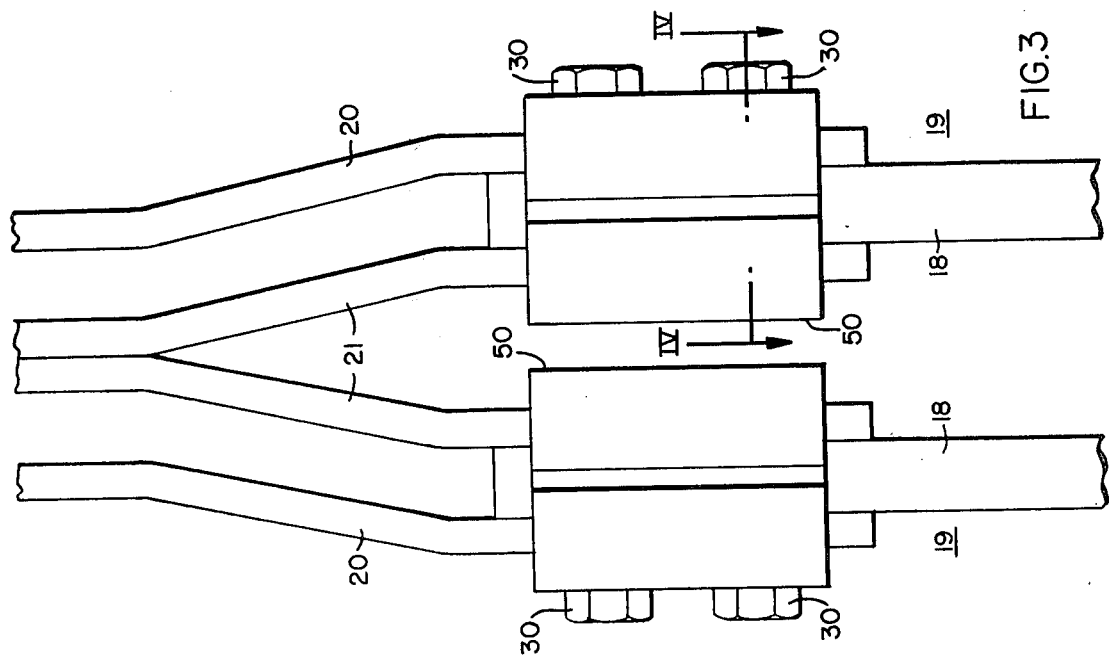

BIAXIAL COMPRESSION PHASE LEAD CONNECTOR

BACKGROUND OF THE INVENTION

1. Field of the Invention

This invention relates to gas-cooled windings of dynamoelectric machines, and more particularly, to means for electrically and mechanically connecting stator phase leads to split phase coils of such windings.

2. Description of the Prior Art

In large inner-cooled turbine generators which utilize a gas such as hydrogen as the cooling medium, the stator winding is usually split to facilitate heat transfer with an inner-cooling duct heat exchanging system. A split conductor arrangement is constructed by joining a large phase lead with two smaller winding conductors in an overlapping arrangement. The phase leads and winding conductors are composed of multiple conductor strands which are arranged in columns, and the combined cross-sectional area of the smaller conductor strands comprising the split winding is equal to the cross-sectional area of the larger conductor strands which comprise the phase lead. The smaller conductors, which are joined with the larger conductor in the end turn region of the stator, are extended in a parallel arrangement with the inner-cooling ducts through axial stator slots. The coolant is circulated through the cooling ducts in direct thermal contact with the current-carrying split winding conductors. The split conductor cooling arrangement has made it possible to greatly increase the maximum power capacities of large generators without exceeding the permissible limits of physical size.

In such heavy current conducting arrangements, high mechanical strength and good electrical conduction are required for the union of the phase lead and split winding conductors. Good electrical conduction and mechanical strength are interrelated fundamentally upon two factors: contact area and contact pressure. The effective contact area relative to the cross-sectonal area of the conductor is of great importance since it controls the resistance of the connection. It must remain uniform in size and not be affected by temperature changes or vibration. The contact pressure must be high enough so that adjacent conductor surfaces are pressed together with essentially all particles of the contact area being interlocked and free from insulating impurities. In a standard conductor group wherein a plurality of stranded conductors having a generally rectangular cross section are stacked one on top of another and two or more of such stranded groups are arranged in overlapping relation, adjacent strands within each group must be pressed together in a direction normal to the plane of the strand engagement, and similarly, adjacent groups must be pressed together in a direction which is normal to the plane of group engagement in order to achieve sufficient contact area and contact pressure. In general, the contact force should be great enough to produce a contact area which is equal to or greater than 1.5 times the cross-sectional area of the conductor. If the force holding the conductors together is too small, only the high points of the surface is touched and large currents passing through such a connection may develop heat and melt the metal at the high spots.

Proper contact pressure and contact area have been provided by a variety of prior art devices. Commonly used phase lead connectors include a one-piece "C" pressure clamp illustrated in FIG. 8 of the drawing. This connector clamp, formed of copper, is rolled to obtain the dimensions necessary to enclose the conductors. The rolled clamp provides only an approximate fit, however, and gaps remain after the pressure clamp is positioned around the stranded conductor union. Since these gaps must be closed during soldering to insure proper contact area and contact pressure, a large compressive force is applied to the connector as it is crimped around the overlapping conductors.

Considerable difficulty has been encountered in maintaining the required contact area and pressure throughout the expected life of the rolled "C" clamp connector. It has been observed that after the connectors are soldered and the compressive force is removed, the ends of the connector clamp tend to spring back to their original shape, resulting in residual tensile stresses in the soldered connection. Furthermore, unbonding of the soldered connection has been found to occur during operation of the turbine generator at high stator load currents. This unbonding is caused by various mechanical disturbances such as vibration and large magnetic forces which are induced by changes in high flux concentration surrounding these phase leads in the end turn regions. Also, when the soldered connection is subjected to high temperatures which accompany heavy current flow, the contact pressure at the union of the conductors is relaxed.

A second type of connector, which avoids some of the disadvantages of the "C" clamp connector, is a two-piece bolted connector which compresses the overlapping conductor groups uniformly in a single direction. Such a connector has been described in the pending application of F. Fidei, Ser. No. 533,406, filed Dec. 16, 1974. This two-piece interlocking connector eliminates the damaged strand problem since the strands are not twisted or otherwise deformed as the connector is tightened about the overlapping stranded conductor groups. However, it applies controllable compression in only one direction and thus does not constrain all variables which determine the quality of the connection. In addition, since bolts must be inserted from both sides of the connector, an assembly problem arises in that the two-piece bolted connectors are generally located side-by-side in pairs, and the bolt heads in the gap between the connectors interfere with the clearance required for induction soldering and ultrasonic testing.

These problems stem directly from the lack of precision in the fitting of the prior art connectors about the conductor strands and in the lack of means for applying and maintaining uniform pressure upon the overlapping conductor groups and adjacent conductors within each group. It is, therefore, a principal object for the present invention to provide a connector having a conductor receiving region which may be accurately adjusted to provide a closely conforming fit for an overlapping, stranded conductor assembly and which also includes means for maintaining controlled, uniform contact pressure of sufficient magnitude and in the proper directions to insure good electrical conductivity as well as mechanical strength.

SUMMARY OF THE INVENTION

In accordance with the present invention, an improved connector is provided for securing overlapping conductor end portions together in a tight compressive union which is highly conductive and mechanically strong. The invention generally comprises a structure for receiving an applied compressive force and transmitting it directly to the overlapping conductor end portions, and means cooperatively associated therewith for transmitting a component of the applied force to the conductor in a direction normal to the applied force.

In a preferred embodiment of the invention, a pair of plate members are arranged in sliding contact with a pair of wedge members and are assembled together to define a conductor receiving opening. In response to a compressive force, the plates are displaced inwardly against the conductors, preferably in a direction which is perpendicular to a plane which contains points of engagement of next adjacent conductors. A component of the applied force is transmitted by the plate members through the wedge members to the conductors by means of an inclined surface engaging arrangement. The surface engaging arrangement comprises planar force transmitting and receiving surfaces which are inclined in mutually complementary angles with respect to a predetermined reference. The wedge members are also displaced inwardly upon the overlapping conductors, but in a direction normal to the applied compressive force.

The minimum dimensions of the conductor opening defined by the assembled plate and wedge members are arbitrarily less than the corresponding dimensions of the overlapping conductors so that a compressive load may be directed upon the conductors when the plates are drawn together. The connector provides a closely conforming fit with the enclosed conductors, and provides uniform compression in two principal directions, so that maximum effective contact area is obtained without the risk of conductor deformation.

BRIEF DESCRIPTION OF THE DRAWINGS

The invention will be more fully understood from the following detailed description of a preferred embodiment, taken in connection with the accompanying drawings, in which:

FIG. 2 is a partial isometric view of the turbine generator of FIG. 1 which illustrates the connection of a split phase lead;

FIG. 3 is an elevation view of the phase lead connector of FIG. 2;

FIG. 4 is an elevation view, partly in section, of a split phase lead connection utilizing the present invention, the view being taken along the line IV—IV of FIG. 3;

FIG. 5 is an elevation view of a plate member;

FIG. 6 is an elevation view of a wedge member;

DESCRIPTION OF THE PREFERRED EMBODIMENT

The present invention is concerned primarily with connecting means for the windings of dynamoelectric machines. Accordingly, in the description which follows the invention is shown embodied in a large gas-cooled turbine generator. It should be understood, however, that the invention may be utilized as a conductor connecting means in any dynamoelectric machine.

Figure 1:
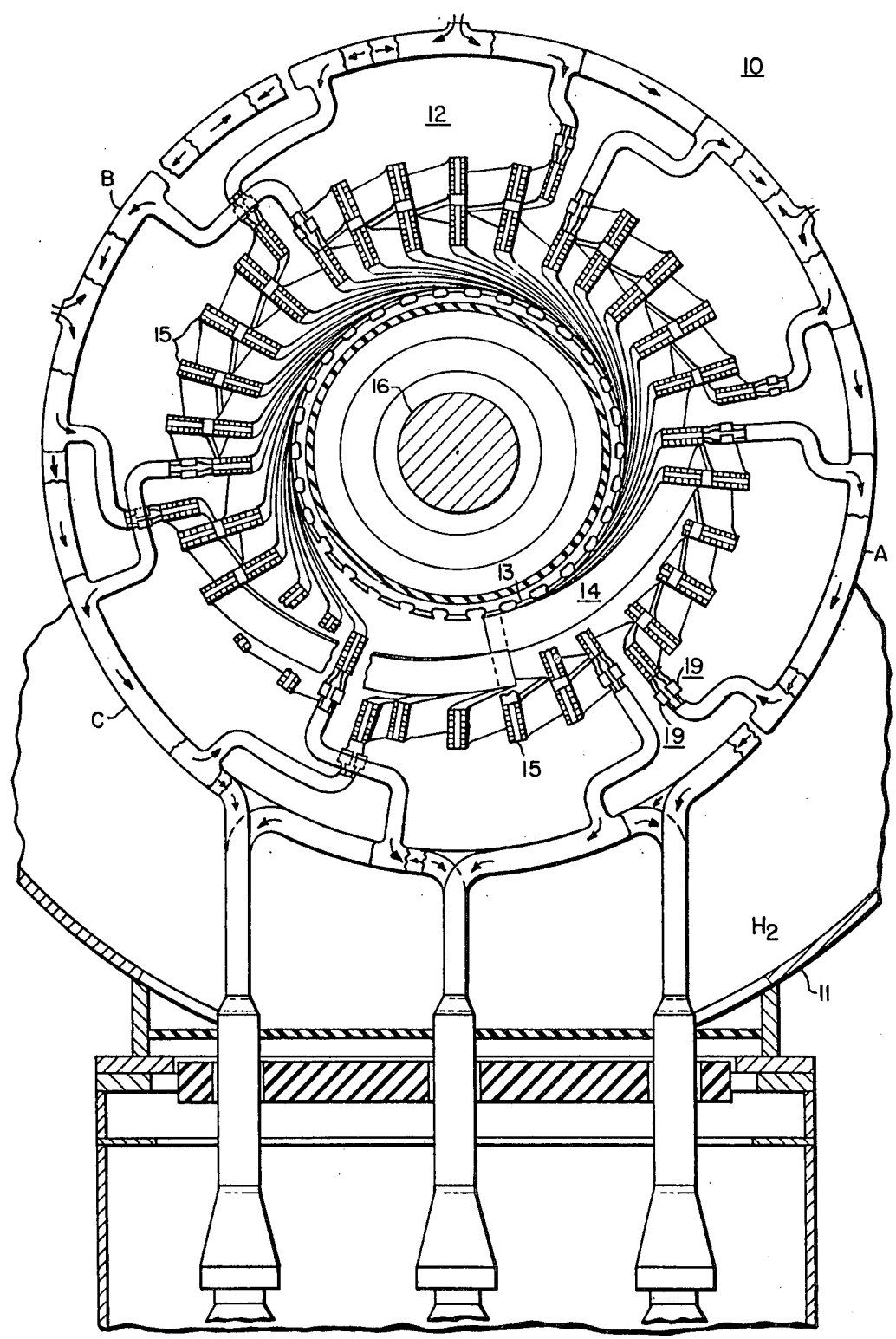
FIG. 1 is a transverse sectional end view of an exemplary turbine generator in which the invention is incorporated.

In FIG. 1 the invention is shown, by way of illustration, disposed in operating position within a large turbine generator 10. The generator 10 may be a two or four pole three-phase machine of almost any rating, but for purposes of the present descriptionn it may be considered to be a two pole 60 Hz three-phase gas cooled generating having a rating in excess of 175,000 kilowatts. The generator 10 may take any form of usual gas ventilating construction which embodies the same or similar features.

As shown in FIG. 1, the generator 10 has an outer gas-tight closing housing 11 which is filled with a coolant gas which is normally hydrogen. The generator 10 has a laminated stator core 12 of usual construction which is supported within the housing 11 in any suitable manner. The stator core 12 is provided with longitudinal slots 13 in the usual manner for the reception of high voltage stator winding coils 14. The winding 14 is of the inner cooled type and is provided with internal ventilating ducts 15 which are open at the ends of the coils to permit the hydrogen to flow through sutiable ducts. The generator 10 also has a rotor member 16 of any suitable type which is provided with a field winding (not shown) preferably also of the inner-cooled type. The coolant gas enters the rotor 16 at both ends and is discharged through radial vents (not shown) at the center of the rotor 16. The coolant gas may be circulated through the machine in any suitable manner. In this system the gas is circulated by a blower (not shown) on the rotor shaft 16 which circulates the coolant gas in a manner generally shown by arrows in FIG. 1. It is to be understood that this particular ventilating system is shown only to illustrate the type of machine to which the present invention is applicable, and that any suitable or desired construction in the ventilating system might be used.

The stator winding 14 of a machine of this type consists of a suitable number of half coils or coil sides, two half coils being disposed in each of the slots 13 and the half coils being connected at the ends to form the complete winding. The winding 14 is connected for three-phase operation, each phase consisting of two-phase zones which are connected by the parallel phase connecting leads A, B, and C, respectively. It will be understood that all of the half coils except those which constitute the terminal portions of the six-phase zones are connected in series with each other, at their ends, at both the front and back ends of the machine by means of conventional winding-apex series connectors 17 between the appropriate top and bottom coil sides. Individual phase leads 18 extend radially from the parallel phase connecting leads A, B, and C and are joined, according to the teachings of the present invention, by means of a bolted phase lead connector 19 with a split half coil portion 20 and a split coil portion 21 to complete the winding connection.

In a preferred form of construction of the stator conductors from which the stator winding is made, each conductor consists of two stacks of strands, which are displaced circumferentially by a stack of cooling duct means 15, so that the strands are disposed on both sides of the duct 15. This description is particularly applicable to the axially straight coil side portions which lie within the conductor receiving slots of the stator core, but the duct ends preferably extend on through to the diamond ends or coil apex portions as shown in FIGS. 1 and 2. The two halves of each stator coil are shown as having their coil side portions disposed in circumferentially spaced slots and having their coil apex portions adjacent to each other at an intermediate point between the circumferentially spaced coil side portions at each end of the coil, being conventional turbo-generator armature construction in this respect.

In FIG. 2 there are shown end portions of two half coils which are connected together. It will be understood, of course, that one of these coil sides will be in the bottom of one slot of the stator core and the other will be in the top of a different slot. At the end of each half coil the ground insulation terminates and the open ends of the ventilating ducts 15 extend out from the end of the coil 14 for entrance or discharge of hydrogen. The conductor strands are usually brought out in separately insulated groups to permit group transpositions to be made between adjacent coils. The groups of conductor strands are formed in the general shape indicated in FIG. 2 and are connected to groups of strands of the adjacent half coil by conventional connectors 17 of any suitable type.

In accordance with the invention, all of the phase lead end connections are of the ventilated conductor, or inner-cooled type, in which suitable ventilating ducts 15 are provided in good heat exchanging relation to respective conductors of these connections. Note that an inner-cooling arrangement is illustrated for these end connections. Portions of these end connection may be in the form as shown in FIG. 2 for the phase lead assembly consisting of a group or stack of conductor strands 18 disposed between two stacks of phase coil strands 20, 21.

In the particular embodiment shown the strands of each conductor are disposed in vertical stacks although other suitable arrangements of strands might be used. Since the strands of each phase coil are shorted together at each end by the phase lead connector means 19, as described more fully hereinafter, a type of transposition should be utilized which makes it possible to connect the strands together at the ends without incurring excessive losses. Each winding conductor is, of course, enclosed in the usual heavy ground insulation, for example as illustrated by the insulation 22 of FIGS. 2 and 7, and which is removed from the extreme ends of each conductor to permitt assembly of the connecting means. In accordance with the usual practice two winding conductors are placed in each slot of the stator core, and the end portions of each conductor beyond the slot are formed in the usual manner to extend around the core for connection with the series connector 17 to the end of another winding conductor lying in a different slot to form a complete coil.

As previously explained, it is necessary to secure the connectors 19 to the ends of the winding 14 with mechanically tight connections. This means that there must by a high pressure union between the connector and the strands which are immediately adjoined and also between the stacks of strands and between the individual strands within each stack. This is necessary to minimize the resistance of the joint and to prevent unbonding of individual strands. The present invention provides a construction which makes it possible to make reliable, mechanically tight phase lead joints between the connector and the strands in a relatively simple manner.

Figure 7:
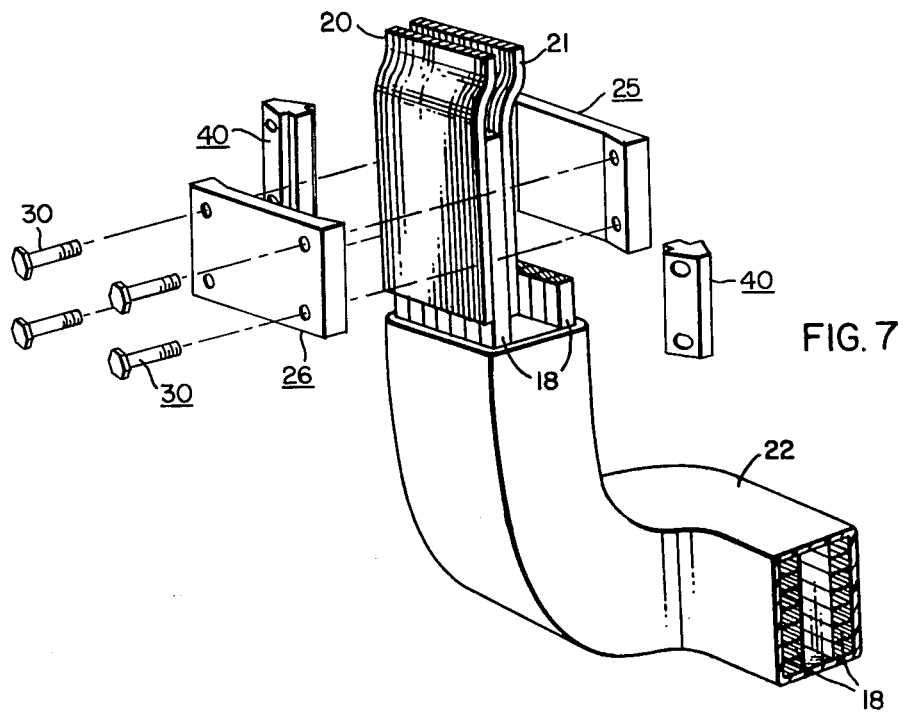
FIG. 7 is an exploded view of a phase lead connector assembly utilizing the present invention in association with split phase leads.
Figure 8:
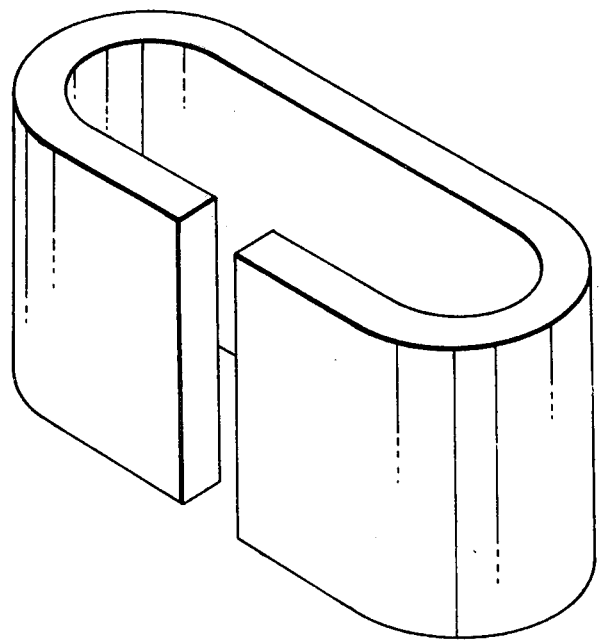
FIG. 8 is an isometric view of a prior art connector clamp.

In a preferred embodiment of the present invention, a phase lead connector 19 comprises first and second plate members 25, 26, which are illustrated in FIGS. 4, 5 and 7. Each of the plates 25, 26 have a flat conductor engaging 27 portion which is generally rectangular in cross-section and which may have any desired dimensions, provided however, that it will accommodate the combined stranded conductors. From each end of each plate member 25, 26 a ramp portion 28, also rectangular in cross-section, projects away from the conductor engaging portion 27 in a manner to be described hereinafter. The ramp portion 28 is preferably integrally formed with the conductor engaging portion 27; however, it may be joined therewith by any suitable means. The plates 25, 26 are preferably fabricated from a highly conductive, non-magnetic metal such as copper. A non-magnetic metal is preferred in order to reduce heating caused by high flux concentrations.

As shown in FIG. 4, the ramp portions 28 of the plate member 25 have a pair of tapped recesses 29 for receiving a threaded end of a screw bolt 30, and the ramp portions of the plate member 26 have two spaced holes to receive and pass the screw bolts 30 of the tapped recesses 29. The tapped receases 29 are preferably reinforced by stainless steel heli-coil inserts (not shown) to prevent stripping of the relatively soft copper.

A compressive force applied to the plate members 25, 26 by the screw bolts 30 is transmitted directly to the overlapping conductors 18, 20, and 21 by the conductor engaging surfaces 27 in a direction which is perpendicular to a plane which contains points of engagement of next adjacent conductor groups. A component of the applied force is transmitted indirectly to the overlapping conductors 18, 20, and 21 by means of a pair of wedge members 40, illustrated in FIGS. 4 and 6, which are disposed in sliding engagement with the ramp portions 28 of each plate member. Each wedge member 40 as a conductor engaging surface 42 and two planar force receiving surfaces 44 which are inclined with respect to the conductor engaging surface 42 at an angle which is the right-angle complement of the angle of inclination of the sloping surface 32 of the ramp portion 28 of each plate member. The surfaces 32 and 44 of the ramp portions and wedge members, respectively, are thus inclined at angles which are mutually complementary, and cooperate in sliding engagement to displace the wedge members 40 inwardly upon the overlapping conductors and thus provide compression in a direction normal to the direction the primary compressive force imparted by the screwbolts 30. A pair of openings 46 are disposed through the wedge member 40 to provide passage for the screwbolts 30 and to allow the wedge member 40 to travel without interference as it is displaced inwardly upon the overlapping conductors. The openings 46 are preferably twice the diameter of the screwbolts 30.

It should be noted that the conductor engaging surface 42 of the wedge members has a centrally raised portion to compensate for a difference in the assembled dimensionss of the center conductor stack 18 as compared with the dimensions of the overlapping conductor stacks 20, 21. The engaging surface 42 may be indented, curved, or of any other suitable configuration to provide uniform engagement with various combinations of conductors and with various confronting cross sections.

The opening defined by the conductor engaging surfaces 27, 42 of the assembled plate and wedge members is generally rectangular and provides a closely conforming fit to the outer confronting surfaces of the overlapping conductors. Referring to the orientation of the connector 19 in the turbine generator 10 of FIG. 2 as reference, the axial clearance of the conductor receiving opening is controlled by the spacing of the wedge members 40, and similarly, the circumferential clearance is controlled by the spacing of the plate members 25, 26. The minimum clearance in either direction, as measured when the tips of the ramp portions 28 are brought into contact with one another and the wedge members 40 are displaced inwardly to the limits of their travel, should be slightly less than the corresponding axial and circumferential dimensions of the overlapping conductors 18, 20 and 21 so that a compressive load directed upon the plate members 25, 26 will be transmitted to the conductors directly through the plate members 25, 26 amd indirectly at right angles through the wedge members 40.

The screwbolts 30 are tightened to establish a compressive union between the plate members 25, 26, the wedge members 40, and the overlapping conductors 18, 20 and 21. A uniform pressure distribution across the conductor-connector interface is desirable, thus the screwbolts 30 are tightened equally. A torque of 10 to 15 footpounds is the preferred range for the embodiment of FIG. 4. the screwbolts 30 are preferably constructed from high strength non-magnetic material such as stainless steel to reduce the heating caused by high flux concentrations.

The degree of axial compression directed upon the conductors as compared to the level of circumferential compression may be varied by changing the angles of inclination of the force transmitting and receiving surfaces 32 and 44, respectively.

As shown in FIGS. 2 and 3, the two plates 25, 26 are assembled with the ramp portions 28 and wedge members 40 disposed about the overlapping conductors 18, 20 and 21. In this assembly, the single phase lead 18 is sandwiched between the two smaller coil leads 20, 21 in an overlapping arrangement. The plates 25, 26 are held together to form a tight union with the overlapping conductors so that maximum contact area is established between the flat portions of the plates 25, 26 and the conductor groups. Similarly, the wedge members 40 hold the individual strands within each conductor stack in tight compression so that maximum contact area is established between individual conductors. The conductor-connector union is then heated, preferably by induction means, to approximately 380° –460°F. The assembly may be drilled for insertion of temperature sensing means (not shown) to measure the internal temperature of the union. After the proper temperature is achieved, ribbon solder is applied to the union. Although any solder composition may be used, a 70Pb –30Sn solder is preferred since it remains in a partially molten state over a wider temperature range, and thus can be uniformly distributed between the conductor strands. Prior to the soldering operations the conductor strands and connector surfaces are cleaned and tinned in the usual manner.

In FIG. 3 it will be noted that all of the screw bolt head portions are conveniently located on the same side of the connector so that they do not interfere with induction soldering procedures or with ultrasonic testing procedures, both of which require access to a large surface area on at least one side of the connector. For example, after the conductors are soldered, the connection is tested by ultrasonic means to detect dicontinuities which may be caused by insufficient interior temperature during soldering, or by improperly fitted conductor portions. A through-transmission scissor-action holding tool with an ultrasonic transducer or each arm is attached in the critical test area located on the outside surface 50 of each plate 25, 26 so that sound is passed through the connection in a path normal to the overlapping conductor groups. This critical test area is not fully available when the screwbolt heads are located on both sides of the connector.

Another important feature of the present invention, illustrated in FIG. 7, is the simple configuration of the phase lead connector plates 25, 26 and wedge members 40 which makes it possible to first assemble the coil strands 18, 20, and 21 in a properly aligned position and then place the separate parts of the connector 19 around the strands without disturbing the strand fit-up. This is especially important in the case where distance between the coil end and the phase lead is very short.

With this arrangement, spacer blocks (not shown) should be installed between the adjacent connector assemblies 19 after testing to prevent buckling of the conductor strands caused by strong magnetic forces which are generated in the end turn regions by transient flux conditions. The natural frequency of vibration of the phase leads is "detuned" by securing the adjacent connector assemblies together.

It will now be apparent that an improved phase lead connector has been prpvided in which biaxial compression is utilized to produce a highly conductive connection for stator winding conductors. The interlocking construction results in a mechanically stable connector which is adequately supported to substantially prevent unbonding of soldered conductors which could occur because of vibration and temperature fatigue.

Certain preferred materials have been described for the purposes of illustration but it will be understood that other suitable materials could be used if desired. While the invention has been illustrated by only one embodiment, it should be understood that in the broadest aspects of the invention certain changes may be made by the omission of unwanted parts, by the addition of parts, or in the substitution of equivalents without departing from the broadest aspects of the invention.

What is claimed is:

1. In a dynamoelectric machine having a stator member and a plurality of coils constituting a stator winding, each of said coils comprising two conductors spaced apart on the strator member and having end portions disposed adjacent to each other for connection to a phase lead, said end portions of said apart conductors being assembled in overlapping relation with said phase lead, the combination with the union of said coil end portions and said phase lead of a connector comprising a pair of spaced apart plate members, a pair of spaced apart wedge members, and means, for positively securng said plate and wedge members together in assembled relationship and in compressive engagement with said coil end portions and said phase lead; said plate and wedge members having surfaces for uniform engagement with said overlapping conductors, said wedge members being disposed in surface-to-surface contact with said conductors and in sliding engagement with said plate members, said wedge members being displaced inwardly upon said overlapping conductors in a direction normal to the direction of the force of compressive engagement provided by said securing means, whereby biaxial compression of said overlapping conductors is provided as said plate members are forced against said conductors by said securing means.

2. A dynamoelectric machine comprising: a stator member and a plurality of coils constituting a stator winding, each of said coils comprising two groups of conductors spaced apart on the stator member and having end portions disposed adjacent to each other for connection to a phase lead group, said end portions of said spaced-apart groups of conductors being assembled in overlapping relation with said phase lead group, the assembled conductor groups and phase lead group being secured in union with each other by a connector, said connector including
- a pair of plate members, each of which has a first engaging surface disposed between two ramp portions, each ramp portion having a planar force transmitting surface which is inclined at a predetermined angle with respect to said first engaging surface;
- a pair of wedge members, each of which has a second engaging surface and two planar force receiving surfaces, each of said planar force receiving surfaces being inclined with respect to said second engaging surface at an angle which is the right angle complement of said predetermined angle of inclination of said ramp force transmitting surfaces;
- said first and second engaging surface defining an open-ended volume where said conductor groups and said phase lead group are disposed when said plate members are arranged in spaced-apart relation and said wedge members are disposed therebetween, said planar force receiving surfaces of said wedge members being disposed in surface-to-surface sliding engagement with said planar force transmitting surfaces of said plate members, with said first engaging surfaces applying a compressive force in a first direction directly to the phase lead group and conductor groups and said second engaging surfaces simultaneously applying a compressive force in a second direction, perpendicular to said first direction, directly to the phase lead group and conductor groups; and
- a means for positively securing said plate members and wedge members together in an assembled relationship wherein said open-ended volume may be varied in size.

3. The connector of claim 2, said open-ended volume defined by said assembled plate and wedge members extending in said first direction and in said second direction, perpendicular to said first direction, by predetermined amounts when said first engaging surfaces are brought into contact with said planar force receiving surfaces, said predetermined opening in either of said directions being arbitrarily less than the corresponding dimension of the overlapping conductor groups and phase lead group, whereby a compressive load will be directed upon said overlapping conductor groups and phase lead group in said first direction as said plates are drawn together by said securing means and also in said second direction as said second engaging surfaces of said wedge members are displaced toward each other.

4. The connector of claim 2, said ramp portions of each plate having a first opening extending therethrough in said first direction and said wedge members having a second opening extending therethrough in said first direction and said wedge members having a second opening extending therethrough, also in said first direction said second opening being larger than said first opening;
- said securing means include screw bolts extending through said first and second openings of said ramp portions and said wedge members, said screw bolts being in threaded engagement with at least one of said plate members, a compressive force being exerted upon said plate members thereby drawing them together as said screw bolts are tightened.

5. The dynamoelectric machine of claim 2, wherein the conductor groups and phase lead group have portions which are held within the connector and are soldered to each other and to said plate and wedge members.

6. The dynamoelectric machine and connector of claim 2, wherein each of said conductor groups and said phase lead group comprise a plurality of stranded conductors, each strandad conductor having a rectangular cross section, said stranded conductors of each group being arranged in a side-to-side relationship one to another, adjacent groups being compressed together in said first direction by said plate members and adjacent strands within each group being compressed together in said second direction by said wedge members as said plate members are drawn together.

* * * * *